United States Patent [19]

Lee

[11] Patent Number: 4,489,105

[45] Date of Patent: Dec. 18, 1984

[54] METHOD OF MAKING A THIN FILM MAGNETIC HEAD

[75] Inventor: Fred S. Lee, Oklahoma City, Okla.

[73] Assignee: Magnex Corporation, Oklahoma City, Okla.

[21] Appl. No.: 326,913

[22] Filed: Dec. 2, 1981

Related U.S. Application Data

[63] Continuation of Ser. No. 152,851, May 23, 1980, abandoned.

[51] Int. Cl.³ ............................ G11B 5/42; H01F 7/06
[52] U.S. Cl. ..................................... 427/123; 29/603; 427/126.4; 427/131; 427/265
[58] Field of Search .................. 427/127–132, 427/48, 123, 126.4, 265; 29/603

[56] References Cited

PUBLICATIONS

Ahn, IBM Tech. Dis. Bull., vol. 12, No. 10, 3-70.

*Primary Examiner*—Bernard D. Pianalto
*Attorney, Agent, or Firm*—Townsend and Townsend

[57] ABSTRACT

A thin film magnetic head is disclosed which includes a substrate, a first layer of magnetic material having a first offset portion, a second layer of magnetic material having a second offset portion overlying the first offset portion, and a layer of conductor material disposed within the cavity defined by the two offset portions. In one embodiment the offset portion of the first magnetic layer is disposed within a recess in the substrate. In a second embodiment the offset portion of the first magnetic layer is disposed between two insulation layers mounted along the top surface of the substrate.

20 Claims, 4 Drawing Figures

METHOD OF MAKING A THIN FILM MAGNETIC HEAD

This application is a continuation of application Ser. No. 152,851, filed May 23, 1980, abandoned.

BACKGROUND OF THE INVENTION

1. Field of the Invention

This invention relates generally to magnetic devices for reading from or writing onto a magnetic storage medium and method of fabricating the same, and more particularly, but not by way of limitation, to thin film magnetic heads which include two magnetic pole elements having offset portions and to methods of manufacturing the same.

2. Description of the Prior Art (Prior Art Statement)

The following statement is my prior art statement in complicance with the guidance and requirements of 37 C.F.R. §§1.56, 1.97 and 1.98.

U.S. Pat. No. 4,151,574 issued to Gerkema et al. discloses a type of magnetic head having a substrate 1 which includes a groove 2 wherein a thin film magnetic field-sensitive element 4 is formed solely on one side wall of the groove.

U.S. Pat. No. 4,092,688 issued to Nomura et al. discloses a multi-track thin film magnetic head which, as shown in FIG. 6 of the patent, proposes a sloped groove substrate which is completely filled with a non-magnetic material 21 on top of which various other layers are deposited.

U.S. Pat No. 3,795,954 issued to Alex et al. discloses in FIG. 1 of the patent a channel-shaped ferrite piece 10 which receives deposition throughout the grooved surface. This deposition is proposed to be of non-magnetic metal layers 20 and 22 and glass layer 28. The glass layer 28 is joined to a glass layer 30 which is carried by a flat ferrite rectangular layer 12.

U.S. Pat. No. 3,672,043 and U.S. Pat. No. 3,564,521, both issued to Trimble et al., discloses a miniature magnetic head. FIG. 2 of each of these patents discloses a substrate 25 having recesses 25a, 25b, and 25c wherein a thin layer 35 of high permeability magnetic material is deposited.

As shown by the preceding references, there is a need for thin film magnetic heads. This need exists because thin film heads reduce the physical size of magnetic recording and playback apparatus and permit better utilization of the available storage area of a recording medium.

In addition to the basic need for thin film magnetic heads, there is the need for such heads to have a structure which reduces cracking and other fabrication defects in the layers of materials applied to the substrate. In particular, as is shown in the cited references and is generally known in the art, in the batch fabrication of thin film magnetic heads the front and back gap regions of the magnetic films have had steep slopes due to the necessary build-up of the intermediate layers on top of the flat surface of the substrate. These slopes have presented a severe coverage problem for, in particular, the top pole magnetic film. This is particularly troublesome when the top pole magnetic film is put on by a vacuum technique such as sputtering or evaporation because the magnetic film tends to crack due to the steepness of the slope along which the layer extends. This cracking reduces the quality or precludes the use of such defective heads and thus creates a need for a type of thin film magnetic head and method of making the same which improves the quality by, reducing or eliminating the cracking problem.

Still another need is to provide a thin film magnetic head having pole elements which are symmetrically placed around the conductor elements of the head. As the cited references indicate and as is generally known in the art, present heads are asymmetrical because they are constructed with various layers built on a flat surface of the substrate. Such asymmetry creates a structure having operating qualities which are inferior to those of a symmetrical structure. Thus, the need arises for a symmetrical head having improved operating characteristics.

Because of these shortcomings of the cited reference, it is believed that the cited references fail to meet these needs.

SUMMARY OF THE INVENTION

The present invention overcomes the above-noted and other shortcomings of the prior art by providing a novel, useful and improved thin film magnetic head. This thin film magnetic head includes a substrate which provides an offset region with which magnetic poles having offset portions are associated. This offset structure permits better coverage by the films over slopes which are less deep than those existing in previous types of heads. This simplifies fabrication and improve magnetic film quality. Furthermore, the offset portion provides a symmetrical enclosure to the conductors thereby enhancing the operation of the present invention.

More particularly, the thin film magnetic head of the present invention comprises a substrate, a first layer of magnetic film a second layer of magnetic film and a layer or multiple layers of electrically conductive material. The substrate includes a top surface having an offset region which is associated with the first layer of magnetic film.

The first layer of magnetic film includes a first front gap portion, a first back gap portion, and a first offset portion which extends between the first front gap and the first back gap. This first offset portion defines a first sloping surface which is disposed in angular relationship to the top surface of the substrate.

The second layer of magnetic film includes a second front gap portion, a second back gap portion, and a second offset portion. The second front gap portion is disposed in aligned spaced relation to the first front gap portion of the first layer of magnetic film. The second back gap portion is disposed adjacent the first back gap portion of the first layer of magnetic film. The second offset portion defines a second sloping surface which is disposed in angular relationship to the top surface and is also disposed in spaced relation to the first sloping surface so that a cavity is defined between these two sloping surfaces.

The layer and/or layers of electrically conducting material is disposed within the cavity formed between the first and second sloping surfaces of the first and second layers of magnetic film.

As more fully described below, this thin film magnetic head of the present invention reduces the depth over which the layers of magnetic film must be placed so that the cracking problem heretofore known in the art is overcome. This is overcome through the design of the offset portions of the first and second layers of magnetic film. Furthermore, these offset portions may be dimensioned so that the cavity formed therebetween is substantially symmetrical to enhance the operating characteristics of the magnetic head.

In addition to the invention structure, the present invention includes a method of making such a thin film magnetic head. This method generally comprises the steps of selecting a substrate having a top surface, creating an offset region associated with this top surface, applying a first layer of magnetic film along the contour of the offset region, constructing a layer or layers of electrically conducting material adjacent the first layer magnetic film within the offset region, and applying a second layer of magnetic film in overlying relation to the first layer of magnetic film and to the layer of electrically conducting material. This second layer may also be applied in substantially symmetrical relation to the first layer of magnetic film and to the electrically conducting material. Furthermore, the step of creating an offset region may include the step of forming a recess which extends from the top surface into the substrate. A second preferred method of creating an offset region may include the step of forming first and second insulation layers on the top surface in spaced relation to each other.

From the foregoing, it is a general object of the present invention to provide a novel, useful and improved thin film magnetic head. Other and further objects, features and advantages of the present invention will be readily apparent to those skilled in the art upon a reading of the description of the preferred embodiments which follows, when taken conjunction with the accompanying drawings.

DETAILED DESCRIPTION OF THE PREFERRED EMBODIMENT OF THE INVENTION

Figure 1:
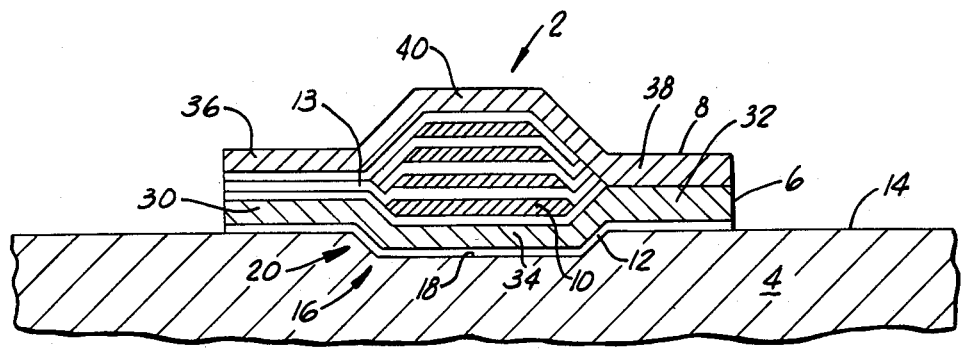
FIG. 1 is a sectional side elevation view of a first preferred embodiment of the present invention.
Figure 2:
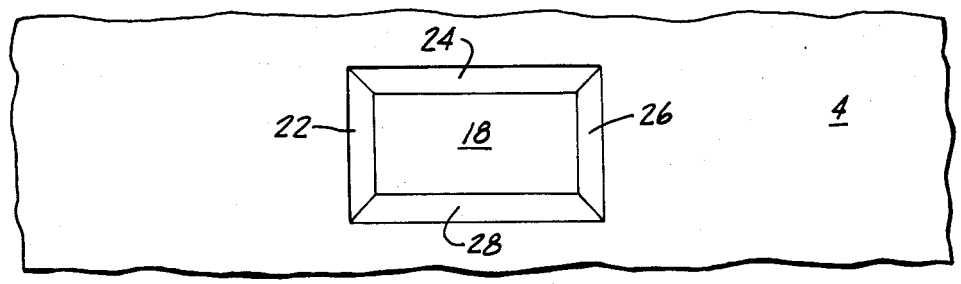
FIG. 2 is a top plan view of the substrate of the first preferred embodiment of the present invention.

Referring now to the drawings and in particular to FIGS. 1 and 2, a first preferred embodiment of the present invention will be described. A thin film magnetic head 2, which is generally, a magnetic device for reading from or writing onto a magnetic storage medium, is shown to include a substrate 4, a first layer 6 of magnetic film, a second layer 8 of magnetic film and one or more layers 10 of electrically conductive material. The thin film head 2 may also include layers 12 and 13 of insulation for separating the substrate 4 from the first magnetic layer 6 and for separating the magnetic layers 6 and 8 and the conductor layers 10, respectively.

The substrate 4, which may be made of silicon, photoceram, ceramic, ferrite or any other material suitable as a thin film subcarrier, includes a top surface 14. FIG. 1 shows that the substrate 4 includes an offset region shown as a recess 16 which is defined by a bottom surface 18 and a side surface 20. The recess 16 may be etched into the substrate by means of any well-known etching technique or it may be formed by any other suitable technique. FIG. 1 further shows that the preferred embodiment bottom suface 18 lies in parallel spaced relation to the top surface 14.

FIG. 2 more particularly discloses that the bottom surface 18 has a rectangular shape. FIG. 2 also shows that the side surface 20 includes four rectangular-associated beveled surfaces 22, 24, 26 and 28. That is, these surfaces extend at a non-perpendicular angle between the top surface 14 and the bottom surface 18 and are connected to define a rectangular perimeter around the recess 16. In the preferred embodiment these side elements extend from the top surface 14 to the bottom surface 18 to define the contour of recess 16 as a frustum of a pyramid.

FIG. 1 next shows that in the first preferred embodiment, the layer 12 of insulation, such as a layer of $SiO_2$, is deposited along the top surface of the substrate and the contour of the recess. This layer serves as a smoothing layer on which the first layer 6 of magnetic film is deposited.

FIG. 1 further shows that the first layer 6 of magnetic film, which provides the bottom thin film magnetic pole of the thin film head 2 and which may be made of NiFe or any other suitable material, includes a first front gap portion 30, a first back gap portion 32 and a first offset portion 34. The front gap portion 30 is associated with the top surface 14, as is the first back gap portion 32. The first offset portion 34 is shown disposed within the recess 16. This offset portion 34 follows the contour of the recess 16 so that the offset portion 34 defines a sloping surface which is disposed in angular relation to the top surface 14.

Still further, FIG. 1 shows that the second layer 8 of magnetic film, which provides the top thin film magnetic pole of the thin film head and which may be made of the same material as the first magnetic layer 6, includes a second front gap portion 36, a second back gap portion 38 and a second offset portion 40. The second front gap portion 36 is shown disposed in aligned spaced relation to the first front gap portion 30. This spaced relationship provides the gap region necessary for reading from or writing onto a recording medium as is known in the art. As shown in FIG. 1, this gap may be filled with a number of layers 13 of insulation. The second back gap region 38 is shown disposed adjacent the first back gap region 32. This adjacent connection permits coupling of the magnetic circuits provided by the magnetic layers 6 and 8. The second offset portion 40 is shown disposed above the recess 16 and defines a second sloping surface extending in angular relation to the top surface and in spaced relation to the first sloping surface of the first offset portion 34. The disposition of the second offset portion in spaced relation to the first sloping surface of the first offset portion 34 defines a cavity therebetween in which the electrically conducting material 10 is disposed. By dimensioning the first and second offset portions appropriately, the cavity can be made substantially symmetrical thereby enhancing the operating characteristics of the head 2.

FIG. 1 further discloses a plurality of layers 10 of conductive material each separated by one of the layers 13 of insulation material. Such insulation layers may be made of $SiO_2$, SiO, $Al_2O_3$, $Si_3N_4$, or any other suitable material. The layers 10 of conductive material may be made of any suitable material and are connected to the ordinary circuitry used with thin film magnetic heads as is known in the art.

Figure 3:
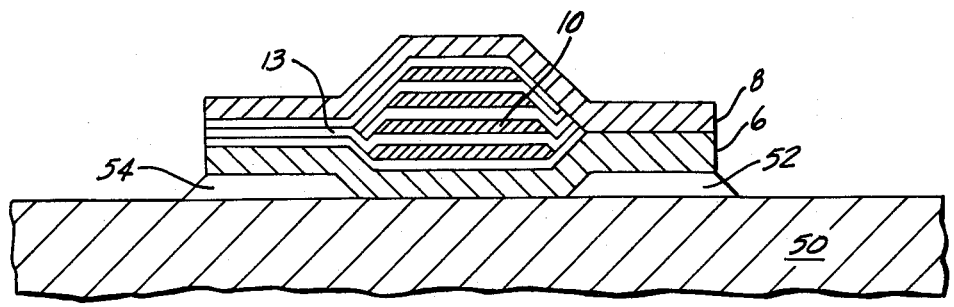
FIG. 3 is a sectional side elevation view of a second preferred embodiment of the present invention.
Figure 4:
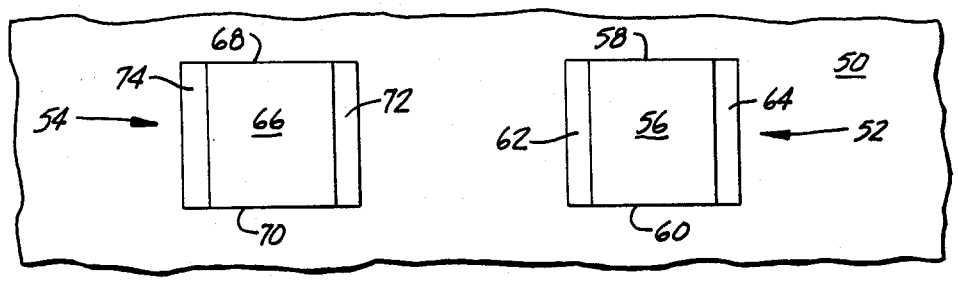
FIG. 4 is a top plan view of the substrate and insulation layer of the second preferred embodiment of the present invention.

With reference now to FIGS. 3 and 4, a second preferred embodiment of the present invention will be described. FIG. 3 discloses that this second embodiment includes a substrate 50, a first insulation layer 52 and a second insulation layer 54 in combination with layers of magnetic film and electrically conductive material such as the first and second film layer 6 and 8 and the conductor material 10, whose layers are separated by the insulation layers 13.

The substrate 50 is identical to the substrate 4 in its composition and in its having a top surface. However, the substrate 50 does not have a recess 16. Instead of the recess 16, the substrate has the first insulation layer 52 disposed on a first area of its top surface and has the second insulation layer 54 disposed on a second area of its top surface.

The first insulation layer 52 is shown in FIG. 4 to include a first upper surface 56, a first side surface 58 extending from the first upper surface 56 to the top surface of the substrate 50, a second side surface 60 extending from the first upper surface 56 to the top surface of the substrate 50 in spaced relation to the first side surface 58, a first inner surface 62 extending from the first upper surface 56 to the top surface of the substrate 50 between the first and second side surfaces, and a first outer surface 64 extending from the first upper surface 56 to the top surface of the substrate 50 in spaced relation to the first inner surface 62 and between the side surfaces 58 and 60. In the preferred embodiment shown in FIG. 4, the upper surface 56 is rectangular and disposed parallel to the top surface of the substrate 50 while the side surfaces 58 and 60 extend perpendicularly to the top surface and the inner and outer surfaces 62 and 64 extend non-perpendicularly from the top surface. Such preferred embodiment sides define the insulation layer to have a shape of a prismoid having rectangular upper and lower bases. Such a shape is obtained by depositing insulation material to a desired thickness along the top surface of the substrate 50 and then using a a chemical etching or other suitable etching technique to construct the shape.

The second insulation layer 54 is constructed similarly to the first insulation layer 52. FIG. 4 shows that this construction includes a second upper surface 66, a third side surface 68 extending from the second upper surface 66 to the top surface of the substrate 50, a fourth side surface 70 extending from the second upper surface 66 to the top surface of the substrate 50 in spaced relation to the third side surface 68, a second inner surface 72 extending from the second upper surface 66 to the top surface of the substrate 50 between the third and fourth side surfaces 68 and 70, and a second outer surface 74 extending from the second upper surface 66 to the top surface of the substrate 50 between the third and fourth side surfaces and in spaced relation to the second inner surface 72. As with the first insulation layer 52, the elements of the second insulation layer 54 are disposed in the preferred embodiment to define the shape of a prismoid having rectangular upper and lower bases. The second insulation layer 54 is likewise preferably constructed in the same manner as the first insulation layer 52.

With respect to the spatial relationship between the first insulation layer 52 and the second insulation layer 54, FIG. 4 shows that the inner surface 72 is disposed in facing spaced relation to the first inner surface 62. Furthermore, FIG. 4 shows that the first side surface 58 and the third side surface 68 are aligned to lie in substantially the same plane FIG. 4 also shows that the second side surface 60 and the fourth side surface 70 similarly are aligned to lie in substantially the same plane, which plane is spaced parallel to the plane of the first and third side surfaces 58 and 68. This spatial relationship thus defines an offset region associated with the substrate 50.

With the insulation layers 52 and 54 constructed in the manner as just described, it is shown in FIG. 3 that the first magnetic layer 6 has its offset portion disposed between the two insulation layers so that the offset portion follows the contour defined by the facing inner surfaces 62 and 72.

From this description of the two preferred embodiments of the present invention, it is apparent that the shortcomings of the prior art are overcome and the previously stated needs are met. The problem of cracking is overcome because the recess 16 or the insulation layers 52 and 54 provide a less deep slope along which the two magnetic layers 6 and 8 are constructed. Furthermore, by providing an offset portion in both of the magnetic layers 6 and 8, a symmetrical cavity may be obtained to enhance the functioning of the head.

Thus, the present invention of a thin film magnetic head is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A method of making a thin film magnetic head comprising the steps of:
    selecting a substrate having a planar top surface;
    defining the walls and bottom of a vacant offset region which in vertical cross-section is a trapezoid having its top side parallel to and longer than its bottom side and having one of its parallel sides in the plane of said top surface;
    forming a first layer of magnetic film adjacent the bottom parallel side and extending parallel to and outward from the top parallel side of sai offset region to form first front and back gap portions;
    forming within said offset region at least one layer of electrically conductive material parallel to the top surface and extending up to a plane above the top parallel side of said offset region; and
    forming a second layer of magnetic film over said electrically conductive material and over said first layer of magnetic film to form second front and back gap portions with said first and second front gap portions being vertically spaced apart to form a front gap region.

2. The method of claim 1 wherein the nonparallel sides of said trapezoid are defined by forming a recess extending from said top surface into said substrate.

3. The method of claim 1 wherein the nonparallel sides of said trapezoid are defined by forming first and second insulation layers in spaced relation to each other on said top surface.

4. The method of claim 1 wherein said step of forming a second layer of magnetic film is preceded by the step of forming at least one layer of insulation over said first front gap portion.

5. The method of claim 4 wherein said step of forming a second back gap portion includes forming the second back gap portion adjacent said first back gap portion.

6. The method of claim 1 wherein said step of forming at least one layer of conductive material includes forming a plurality of layers of conductive material.

7. The method of claim 6 wherein said step of forming a plurality of layers of conductive material includes the step of forming a sandwich of layers of conductive material alternated with layers of insulation.

8. A method of forming a thin film magnetic head comprising the steps of:
selecting a substrate having a planar top surface;
forming a recess extending from an area in the plane of said top surface down into said substrate to a recess bottom parallel to said top surface, smaller than the area in the plane of said top surface and surrounded by and connected to said top surface by sloping recess walls;
forming a first layer of magnetic film within said recess and covering said recess walls and extending in two diametrically opposed directions out of said recess to form first front and back gap portions parallel to said top surface;
forming within said recess at least one layer of electrically conductive material parallel to, and having a thickness sufficient to extend above, the top surface;
forming a second layer of magnetic film over said conductive material and over said first layer of magnetic film to form second front and back gap portions with said first and second front gap portions being vertically spaced apart to form a front gap region.

9. The method of claim 8 wherein said step of forming a second layer of magnetic film is preceded by the step of forming at least one layer of insulation over said first front gap portion.

10. The method of claim 9 wherein said step of forming a second back gap portion includes forming the second back gap portion adjacent said first back gap portion.

11. The method of claim 8 wherein said step of forming at least one layer of conductive material includes forming a plurality of layers of conductive material.

12. The method of claim 11 wherein said step of forming a plurality of layers of conductive material includes the step of forming a sandwich of layers of conductive material alternated with layers of insulation.

13. The method of claim 8 wherein said step of forming a recess is followed by the additional step of forming a layer of insulation within said recess and covering said recess walls and extending in two diametrically opposed directions out of said recess.

14. The method of claim 8 wherein said area in the plane of the top surface is rectangular, said recess bottom is rectangular, and said recess walls are trapezoidal.

15. A metod of forming a thin film magnetic head comprising the steps of:
selecting a substrate having a planar top surface;
forming, spaced apart on said top surface, first and second insulation islands, each said island having a planar rectangular upper surface parallel to the substrate top surface, said islands having mutually parallel facing inner surfaces, each island inner surface forming a plane sloping down from the island upper surface to the substrate top surface and towards the other island inner surface, the area of said substrate top surface between said island inner surfaces defining an offset region;
forming a first layer of magnetic film in the offset region and extending over the inner surfaces and upper surfaces of said first and second islands to comprise first back and front gap portions respectively;
forming within said offset region at least one layer of electrically conductive material parallel to the top surface and extending up to a plane above the upper surfaces;
forming a second layer of magnetic film over said electrically conductive material and over said first layer of magnetic film to form second front and back gap portions, said first and second front gap portions being vertically spaced apart to form a front gap region.

16. The method of claim 15 wherein said step of forming a second layer of magnetic film is preceded by the step of forming at least one layer of insulation over said first front gap portion; and
wherein said step of forming a second back gap portion includes the step of forming the second back gap portion adjacent said first back gap portion.

17. The method of claim 15 wherein said step of forming at least one layer of conductive material includes the step of forming a plurality of layers of conductive material.

18. The method of claim 17 wherein said step of forming a plurality of layers of conductive material includes the step of forming a sandwich of layers of conductive material alternated with layers of insulation.

19. The method of claim 15 wherein each said island is formed with an outer surface comprising a plane sloping down from the island upper surface to the substrate top surface, said outer surface being parallel to, and on the opposite side of said island from, said inner surface.

20. The method of claim 19 wherein each said island has two parallel side surfaces on the two remaining sides of the island, said side surfaces extending perpendicularly from said upper surface to said top surface.

* * * * *